US006456733B1

(12) United States Patent
Miyauchi et al.

(10) Patent No.: US 6,456,733 B1
(45) Date of Patent: Sep. 24, 2002

(54) PRINTED IMAGE INSPECTION APPARATUS

(75) Inventors: Cyuuji Miyauchi, Tokyo; Kazuo Aihara, Yokohama, both of (JP)

(73) Assignee: Tokyo Kikai Seisakusho, Ltd. (JP)

(*) Notice: Subject to any disclaimer, the term of this patent is extended or adjusted under 35 U.S.C. 154(b) by 0 days.

(21) Appl. No.: 09/240,995

(22) Filed: Feb. 1, 1999

(30) Foreign Application Priority Data

Apr. 23, 1998 (JP) .............................. 10-112984

(51) Int. Cl.$^7$ ................................. G06K 9/00
(52) U.S. Cl. ........................ 382/112; 382/100
(58) Field of Search ................. 382/112, 100; 347/19; 356/419; 250/221; 355/401; 358/1.15

(56) References Cited

U.S. PATENT DOCUMENTS

| | | | | |
|---|---|---|---|---|
| 4,653,925 A | * | 3/1987 | Thornton, Jr. | 356/419 |
| 4,910,550 A | * | 3/1990 | Ohashi et al. | 355/27 |
| 5,028,963 A | * | 7/1991 | Ohashi et al. | 355/27 |
| 5,146,545 A | * | 9/1992 | Maruyama | 395/115 |
| 5,440,650 A | * | 8/1995 | Hieda et al. | 382/112 |
| 6,036,298 A | * | 3/2000 | Walker | 347/19 |
| 6,124,587 A | * | 9/2000 | Bidiville et al. | 250/221 |

FOREIGN PATENT DOCUMENTS

JP        9-156080        6/1997

OTHER PUBLICATIONS

Nov. 20, 1992, Iro no Ohanashi (A Story on Colors), Japanese Standard Association.

Nov. 15, 1988, Shikisaigaku Nyumon (Introduction to Chromatics), Nihon Insatsu Shimbunsha.

JIS P3101 Printing Papers.

JIS P3001 Newsprints.

* cited by examiner

*Primary Examiner*—Leo Boudreau
*Assistant Examiner*—Abolfazl Tabatabai
(74) *Attorney, Agent, or Firm*—McGlew and Tuttle, P.C.

(57) ABSTRACT

A printed image inspection apparatus comprises an image reading section that irradiates a printed image being inspected with two types of light having different dominant wavelengths and reads images from the reflections of the two types of light, a judgment section that compares the images read by the image reading section with reference images stored in advance and judges the agreement between both, and an operation control section that control the operation of the image reading section and the judgment section. The image reading section comprises a first light source outputting blue light having a low reflectance with respect to yellow, magenta and black inks, and a second light source outputting yellow light having a low reflectance with respect to cyan, magenta and black inks.

22 Claims, 12 Drawing Sheets

PRINTED IMAGE INSPECTION APPARATUS

FIELD OF THE INVENTION

This invention relates generally to printed image inspection apparatus, and more particularly to printed image inspection apparatus that reads as an image the image produced by merging images formed by a plurality of color inks and compares the merged image with reference images produced by the same number of color inks. More specifically, this invention relates to printed image inspection apparatus for inspecting a printed image being inspected by applying two types of light having different dominant wavelengths onto the printed image being inspected, reading images from the reflected light, and comparing them with reference images stored in advance.

BACKGROUND OF THE INVENTION

A printed image inspection apparatus for inspecting a printed image being inspected by applying two types of light having different dominant wavelengths onto the printed image being inspected, reading images from the reflected light, and comparing them with stored reference images is well known. The printed image inspection apparatus of this type is based on the fact that inspection of full-color printed matter does not necessarily requires the separation of color images, unlike the reproduction of a color print, as disclosed in Japanese Published Unexamined Patent Publication No. Hei-9(1997)-156080, for example.

The printed image inspection apparatus disclosed in Japanese Published Unexamined Patent Publication No. Hei-9(1997)-156080 relies on the fact that blue light is absorbed better by yellow or magenta (a reddish purple) ink than by cyan (a bluish green) ink, while red light is absorbed better by cyan ink than by yellow or magenta ink.

An image is read when light of blue and red colors is applied on a printed image being inspected, and the reflected light is received by a light receptor. The image read by applying blue light is compared with an image obtained by merging the reference images of the yellow, magenta and black inks of the printed image being inspected that has been stored in advance. The image read by applying the red light is then compared with the image obtained by merging the reference images of the cyan and black inks of the printed image being inspected that has been stored in advance. In this way, the printed image being inspected is inspected through these comparison.

In studying printed image inspection apparatus for inspecting full-color printed matter without splitting the printed image into images of various colors, we gave consideration to the following points.

Firstly, yellow, cyan, magenta and black inks are usually used in full-color printing. Spectral distribution curves (curves indicating the reflectance of light of each wavelength) of yellow, cyan and magenta inks are as shown in FIGS. 13, 14 and 15. These curves are described in page 153 of "Iro no Ohanashi" (A Story on Colors) (Japanese Standard Association, Nov. 20, 1992). Black ink has a very low reflectance close to zero for light of any wavelength.

Secondly, JIS (Japanese Industrial Standard) P3101 (printing paper) provides that the brightness of uncolored printing paper be at least 55%. The brightness of printing paper is the value obtained in accordance with JIS P8123 (Hunter brightness testing methods for paper and pulp) that is almost equal to the reflectance of the paper when the paper surface is irradiated with the light of a dominant wavelength of 457.0±0.5 nm (blue light). JIS P3001 (newsprint paper) allows newsprint to have a brightness of 45%, min., almost equal to that of printing paper.

Thirdly, the printed image inspection apparatus disclosed in Japanese Published Unexamined Patent Publication No. Hei-9(1997)-156080 applies light to a printed image being inspected, and reads the image by the reflected light. In this case, the amount of reflected light is lessened compared with the amount of reflected light from the paper surface because the printed image being inspected absorbs part of the applied light. The printed image inspection apparatus disclosed in Japanese Published Unexamined Patent Publication No. Hei-9(1997)-156080 reads by a light receptor the difference in the amount of reflected light as contrast. The higher the degree of contrast, that is, the print contrast signal value (hereinafter referred to as the PCS value for short), the more accurately the apparatus read the image. The PCS value is calculated by the following equation.

PCS=(reflectance of paper surface−reflectance of image)/reflectance of paper surface In general, any optically readable image has a PCS value of more than 0.5; a practically readable image has a PCS value of more than 0.6, or preferably more than 0.8. This is described in pp. 215 to 216 of "Shikisaigaku Nyumon" (Introduction to Chromatics) (Nihon Insatsu Shimbunsha, Nov. 15, 1988), for example.

Furthermore, based on the first through three points, it can be considered that practically effective images can be read by irradiating the paper being inspected with blue light similar to that for measuring the brightness of paper, as mentioned earlier (light of a dominant wavelength of 430 to 490 nm), for example. In this case, the reflectance of the image being read must be a value that can make the PCS value more than 0.6, where the PCS value is determined by the relationship between the image and the brightness (the value almost equal to the reflectance of the paper with respect to blue light) of the paper on which the image is printed. In addition, it is considered that the brightness with respect to blue light (light having a dominant wavelength of 457.0±0.5 nm) of printing paper as specified by JIS is 55%, min., and the brightness with respect to blue light of newsprint as specified by JIS is 45%, min. From the above discussion, it is found that the blue-light reflectance of images printed on these paper types must be less than 18% in order to read images printed on printing paper and newsprint as specified by JIS through irradiation of blue light to a practically effective degree.

Based on these considerations, we studied the stain detection performance of printed image inspection apparatus that inspects full-color printed matter without splitting the image into images of each color, and obtained the following observations.

The printed image inspection apparatus disclosed in Japanese Published Unexamined Patent Publication No. Hei-9 (1997)-156080, for example, reads a printed image as the image obtained by merging yellow-ink, magenta-ink and black-ink images using blue light, as described above, and compares the read image with the image obtained by merging the reference images of yellow-ink, magenta-ink and black-ink. That is, the printed image inspection apparatus cannot separate yellow from magenta. The printed image inspection apparatus that cannot separate yellow from magenta cannot detect magenta-colored stains on a yellow background, and yellow-colored stains on a magenta background.

As is apparent from FIG. 16 combining spectral distribution curves shown in FIGS. 13 through 15, there is no region where both the reflectance values of yellow and magenta inks with respect to blue light (light having a dominant wavelength from 430 to 490 nm) are less than 18%. Two wavelengths (470 and 590 nm) shown in FIG. 16 are those of the light sources selected for the present invention. The printed image inspection apparatus disclosed in Japanese Published Unexamined Patent Publication No. Hei-9(1997)-156080 can inspect full-color printed images on printing paper and newsprint, both having high brightness values, except for magenta-colored stains on a yellow-colored background and yellow-colored stains on a magenta-colored background, both described earlier. With the printed image inspection apparatus using blue and red light, however, either of yellow-ink or magenta-ink images cannot be read on printing paper or newsprint having low brightness values even if the printing paper or newsprint satisfies JIS standards in terms of brightness. For this reason, printed image inspection apparatus using light having no range where both the reflectance values of yellow and magenta inks are less than 18% may be incapable of inspecting printed images containing images of these inks.

SUMMARY OF THE INVENTION

It is an object of the present invention to provide printed image inspection apparatus that can detect not only yellow, cyan and magenta stains on a white background, but also cyan and magenta stains on a yellow background, yellow and magenta stains on a cyan background, and yellow and cyan stains on a magenta background.

It is another object of the present invention to provide printed image inspection apparatus that can inspect with high accuracy full-color images on printing paper and newsprint, both satisfying at least JIS standards in terms of brightness, using two types of light.

It is a further object of the present invention to provide printed image inspection apparatus that can inspect with relatively high accuracy full-color images on printing paper and newsprint, both having low brightness values, using two types of light.

The printed image inspection apparatus of the present invention comprises an image reading section for irradiating a printed image being inspected with two types of light having different dominant wavelengths and reading the image from the reflected light, a judgment section for comparing the image read by the image reading section with the reference image that has been stored in advance to judge agreement between both, and an operation control section for controlling the operations of the image reading section and the judgment section; the image reading section having first and second light sources, with the first light source being one of the light sources of the aforementioned two types of light outputting blue light having low reflectance values with respect to yellow, magenta and black inks, and the second light source being the other light source outputting yellow light having low reflectance values with respect to cyan, magenta and black inks.

According to an embodiment of the present invention, the first light source emits blue light having a dominant wavelength in a range of 430–480 nm, and the second light source emits yellow light having a dominant wavelength in a range of 540–590 nm.

According to another embodiment of the present invention, the first light source emits blue light having a dominant wavelength of 470 nm, and the second light source emits yellow light having a dominant wavelength of 590 nm.

According to the printed image inspection apparatus of the present invention, yellow and magenta stains on a white background can be detected by blue light, and cyan and magenta stains on a white background can be detected by yellow light. Magenta and cyan stains on a yellow background can be detected by yellow light, and yellow and magenta stains on a cyan background can be detected by blue light. In addition, a yellow stain on a magenta background can be detected as a lack of the magenta background by yellow light, and a cyan stain on a magenta background can be detected as a lack of the magenta background by blue light.

Inspection of a printed image on paper having low brightness inevitably involves a slight drop of the detection accuracy of magenta stains on a cyan background and cyan stains on a magenta background. Furthermore, inspection of a printed image on paper having low brightness inevitably leads to uncertainty in reading magenta-ink images. These drawbacks, however, hardly pose practical problems because there are few cases of full-color printing on paper having low brightness.

DESCRIPTION OF THE PREFERRED EMBOIDMENTS

Figure 1:
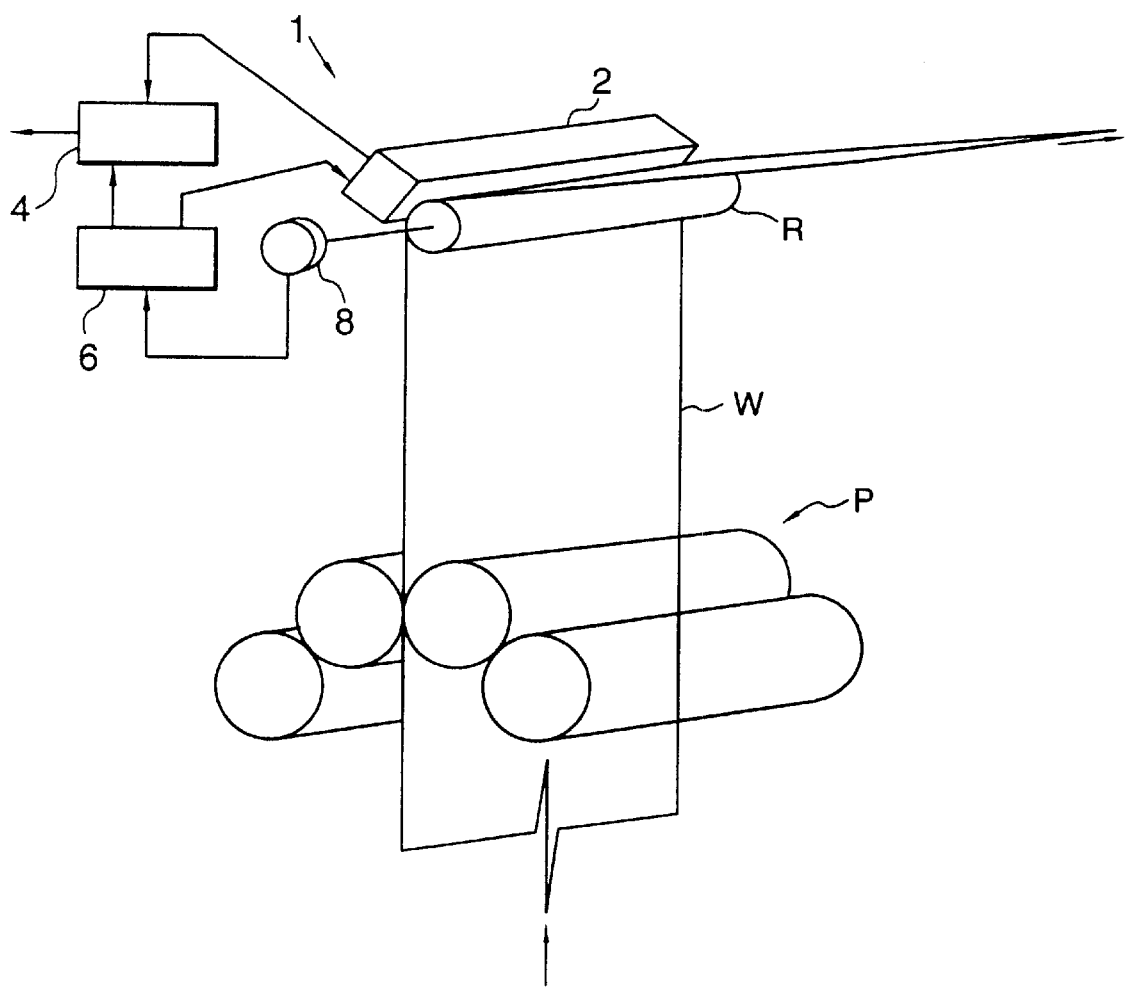
FIG. 1 is a schematic diagram showing a printing press using a paper web in which printed image inspection apparatus embodying the present invention is installed.

As shown in FIG. 1, printed image inspection apparatus 1 comprises an image reading section (or unit) 2, a judgment section 4, and an operation control section 6. The image reading section 2 is installed facing a paper web W that travels downstream a printing machine P guided by a roller R, and reads an image printed on the paper web W. The judgment section 4 judges the image read by the image reading section 2. The operation control section 6 control the operation of the image reading section 2 and the judgment section 4. Signals from a traveling distance signal output means 8 are led to the operation control section 6.

The image reading section 2 has a light-emitting diode 21 as a light source, and a photodiode 31 for receiving the reflected light from the surface of the printed paper web W (hereinafter referred to as a paper web surface), as shown in FIGS. 4, 5, 7, 8, 10 and 11.

Figure 13:
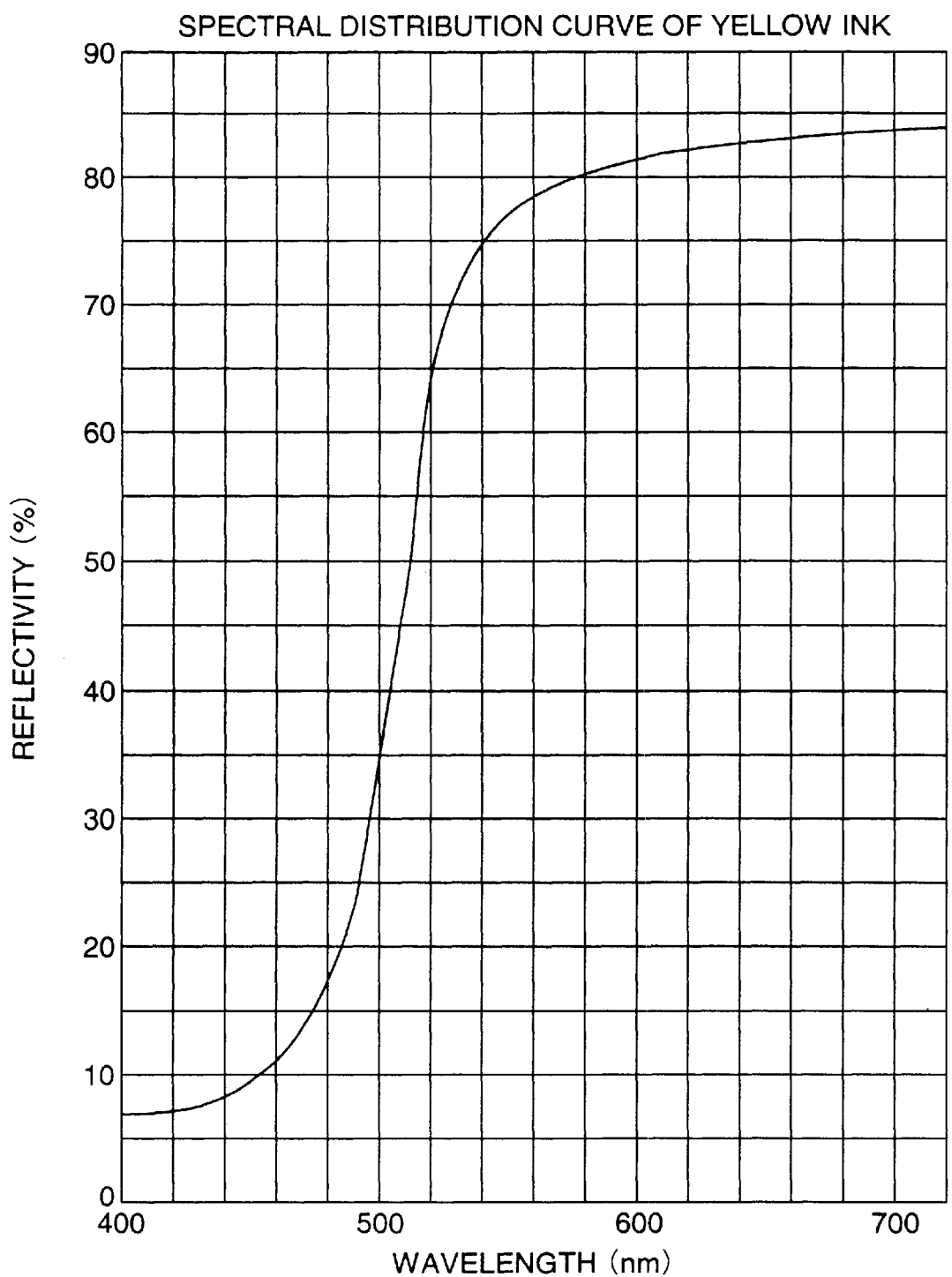
FIG. 13 is a diagram illustrating the spectral distribution curve of yellow ink.
Figure 14:
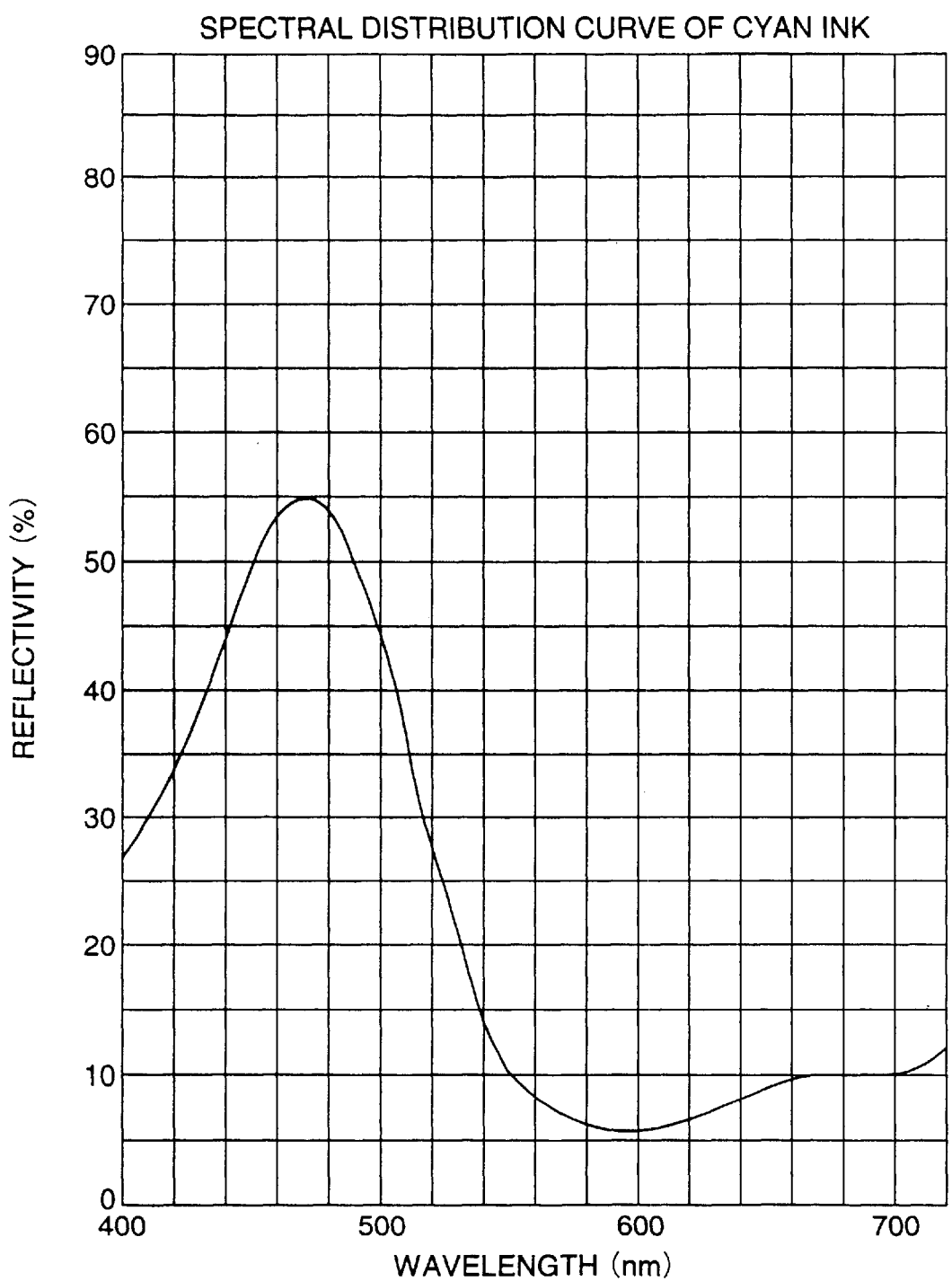
FIG. 14 is a diagram illustrating the spectral distribution curve of cyan ink.
Figure 15:
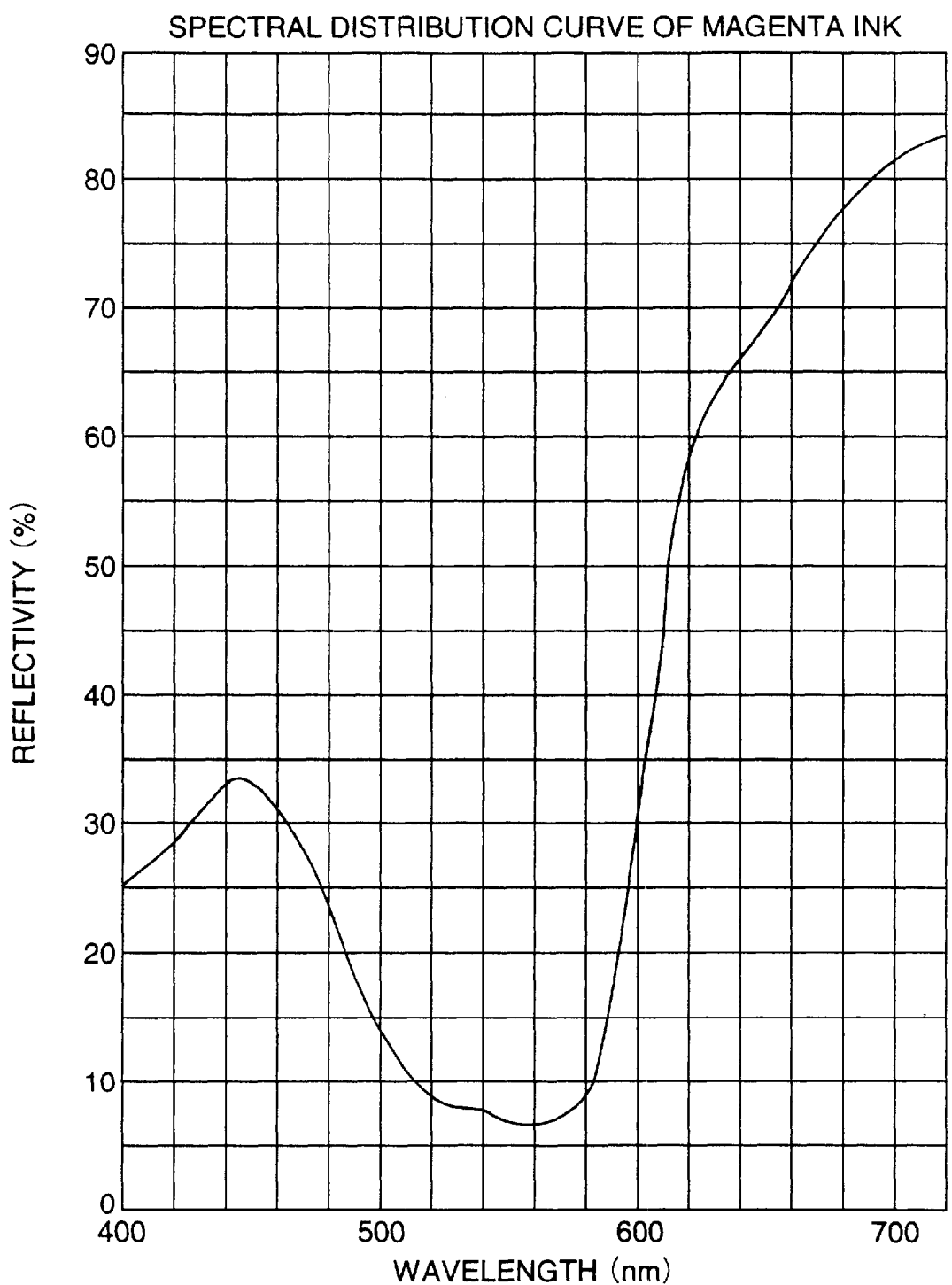
FIG. 15 is a diagram illustrating the spectral distribution curve of magenta ink.

The image reading section 2 of the printed image inspection apparatus 1 irradiates a printed image with predetermined blue light to read a yellow-ink image, a magenta-ink image and a black-ink image from the reflected light, and irradiates a printed image with predetermined yellow light to read a cyan-ink image, a magenta-ink image and a black-ink image from the reflected light. As is apparent from FIGS. 13 and 16, the blue light used should be light with which the reflectance of yellow ink is at least less than 18%, that is, light having a dominant wavelength in a range of 430–480 nm, or preferably be light having a dominant wavelength of 470 nm, for example. As is evident from FIGS. 14 through 16, the yellow light used should be light with which the reflectance of cyan ink and magenta ink is at least less than 18%, that is, light having a dominant wavelength in a range of 540–590 nm, or preferably be light having a dominant wavelength of 540 nm, for example.

Figure 16:
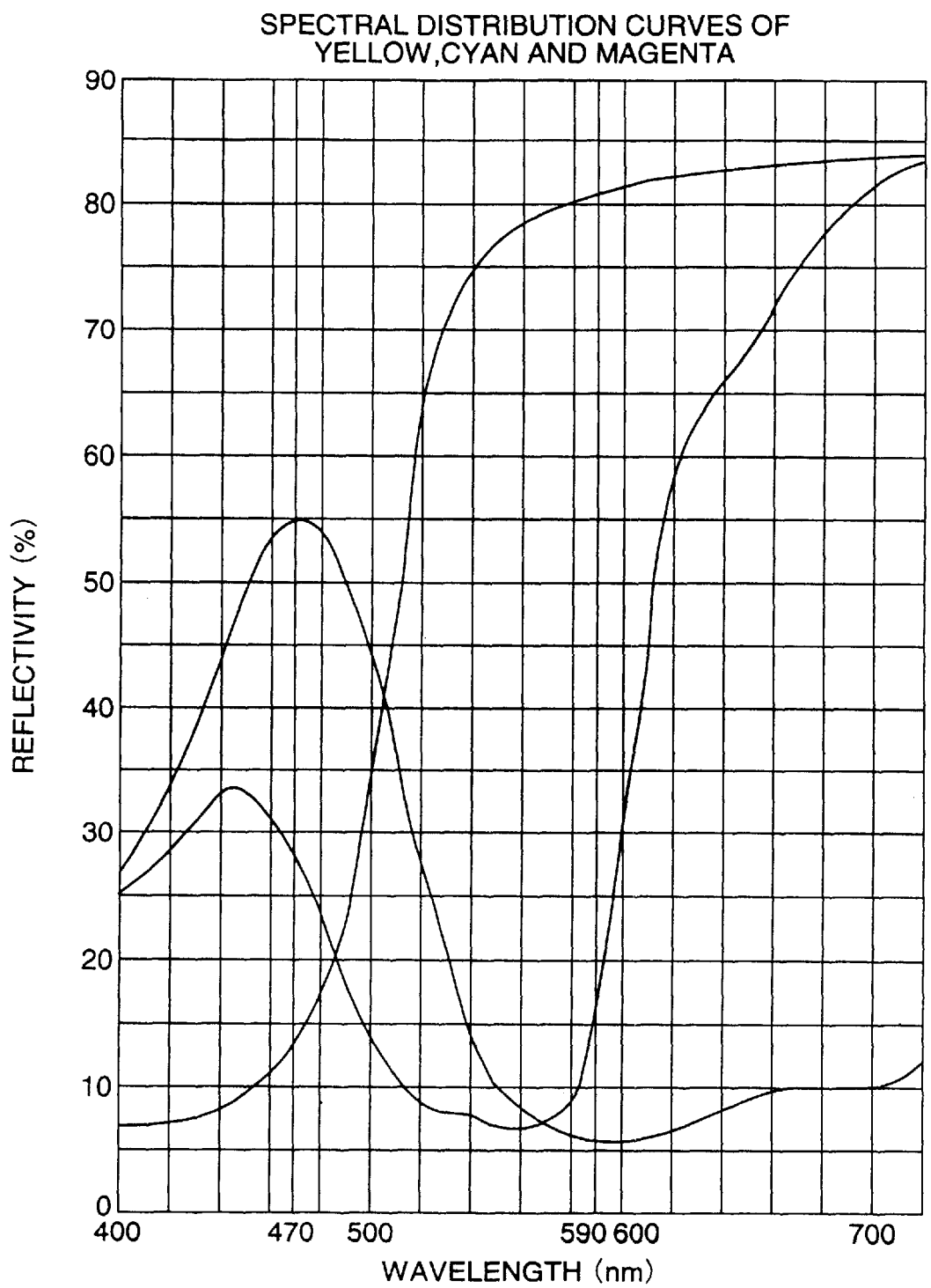
FIG. 16 is a diagram combining spectral distribution curves shown in FIGS. 13 through 15 on the same coordinates.

Magenta and cyan stains on a yellow background are detected by yellow light as "darkness" in the reflected light. This can be understood from the fact that the reflectance of yellow is high and the reflectance of magenta and cyan is low with respect to yellow light, as shown in FIG. 16. When the dominant wavelength of yellow light is lower than 540 nm, the reflectance of cyan increases sharply, and when the dominant wavelength is higher than 540 nm, the reflectance of magenta increases sharply. For this reason, light in this wavelength range is not used as yellow light. When the dominant wavelength of yellow light is 540 nm, the reflectance of yellow is sufficiently high, while the reflectance of magenta and cyan is as low as less than 18%. This type of light is therefore desirable as yellow light to be used.

When detecting magenta and cyan stains, the reflectance of magenta and cyan to be detected is less than 18% with respect to yellow light. Consequently, images printed on printing paper and newsprint specified by JIS can be read practically effectively through irradiation of yellow light.

Yellow and magenta stains on a cyan background can be detected by blue light as "darkness" in the reflected light. This can be understood from the fact that the reflectance of cyan is high and the reflectance of yellow and magenta is low with respect to blue light, as shown in FIG. 16. When the dominant wavelength of blue light is lower than 430 nm and higher than 480 nm, the reflectance of cyan drops sharply. This wavelength range is therefore not used as blue light. When the dominant wavelength of blue light is 470 nm, the reflectance of cyan is almost maximum, the reflectance of magenta is relatively low, and the reflectance of yellow is as low as less than 18%. Consequently, this type of light is suitable for blue light to be used.

When detecting yellow stains, the reflectance of yellow being detected is less than 18% with respect to blue light. Images printed on printing paper and newsprint specified by JIS can therefore be read through irradiation of blue light to a practically effective degree.

As noted earlier, magenta stains can be detected by both blue and yellow light as "darkness" in both of the reflected light. For this reason, magenta stains can be separated from cyan or yellow stains. That is, magenta, cyan and yellow stains can be separated from each other.

Yellow stains on a magenta background are detected by yellow light as a lack of the magenta background, that is, as a "brightness" in the reflected light. This can be understood from the fact that the reflectance of yellow is high and that of magenta is low with respect to yellow light, as shown in FIG. 16. It can be understood from FIG. 16 that it is difficult to judge yellow stains on a magenta background by using blue light.

Cyan stains on a magenta background are detected by blue light as a lack of the magenta background, that is, as a "brightness" in the reflected light. This can be understood from the fact that the reflectance of cyan is high and that of magenta is low with respect to blue light, as shown in FIG. 16. It can be understood from FIG. 16 that it is difficult to judge cyan stains on a magenta background by using yellow light.

Yellow, cyan and magenta stains on a white background of the paper web W are detected by two types of light in the following manner.

Yellow and magenta stains on a white background are detected by blue light as "darkness" in the reflected light. As shown in FIG. 16, this is attributable to the fact that the reflectance of yellow and magenta is low with respect to blue light. Since the reflectance of cyan drops sharply when the dominant wavelength of blue light is less than 430 nm and higher than 480 nm, yellow and magenta stains cannot be distinguished from cyan stains. It is partly due to this factor that this wavelength range is hardly used as blue light. Light having a dominant wavelength of 470 nm is most suitable for blue light to be used for this purpose because the reflectance of cyan is almost maximum and differs greatly from the reflectance of magenta and cyan.

Cyan and magenta stains on a white background are detected by yellow light as "darkness" in the reflected light. This is attributable to the fact that the reflectance of magenta and cyan is low with respect to yellow light, as shown in FIG. 16. Since the reflectance of cyan increases sharply when the dominant wavelength of yellow light is lower than 540 nm, while the reflectance of magenta increases sharply when the dominant wavelength is higher than 540 nm, cyan and magenta stains cannot be distinguished from yellow stains. It is partly due to this factor that this wavelength is not used as yellow light. Yellow light having a dominant wavelength of 540 nm is most suitable as yellow light to be used for this purpose because the reflectance of yellow is sufficiently high and differs greatly from the reflectance of magenta and cyan.

In this way, both the area printed by yellow ink and the area printed by magenta ink in an image printed on printing paper or newsprint satisfying JIS standards having low brightness can be detected positively. Printed images can therefore be inspected using two types of light with very high accuracy even when the brightness of paper is low, compared with conventional inspection apparatus.

Figure 6:
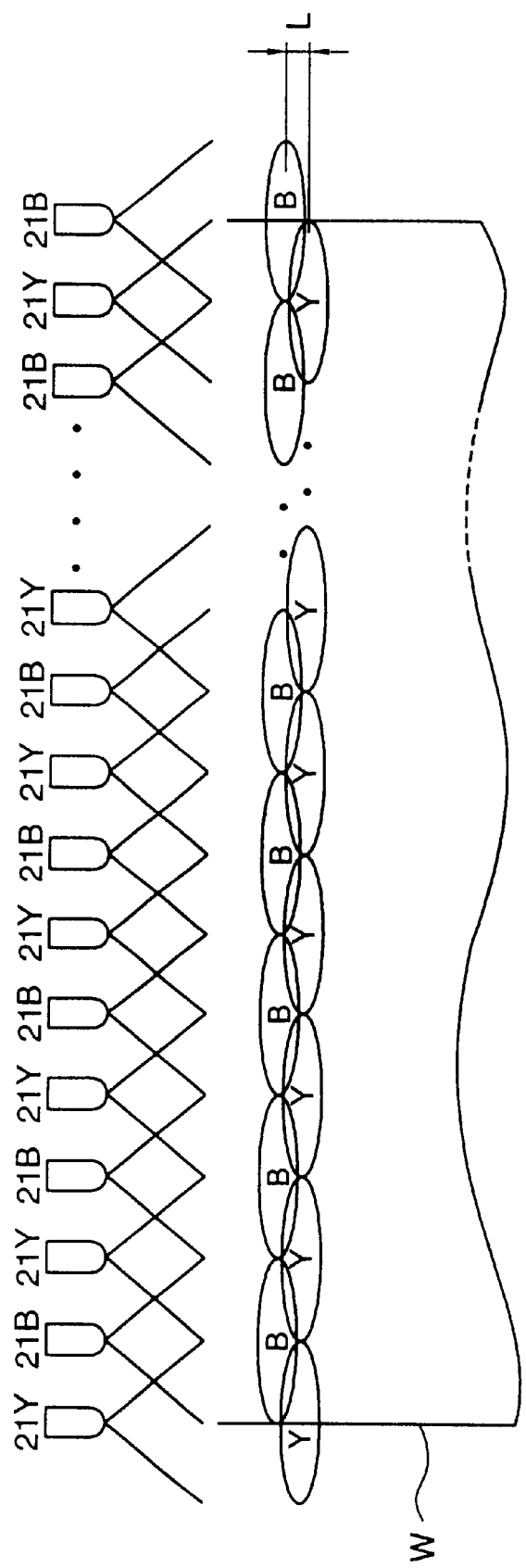
FIG. 6 is a development illustrating an outline of the layout of light sources of two types of light provided in the image reading section shown in FIGS. 4 and 5, and the across-the-width area of a paper web to which light of each light source is applied.
Figure 9:
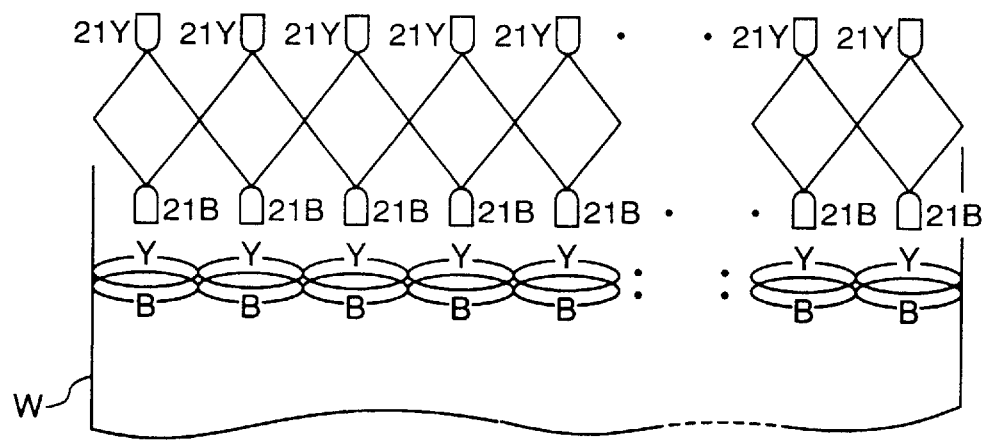
FIG. 9 is a development illustrating an outline of the layout of light sources of two types of light provided in the image reading section shown in FIGS. 7 and 8, and the across-the-width area of a paper web to which light of each light source is applied.
Figure 12:
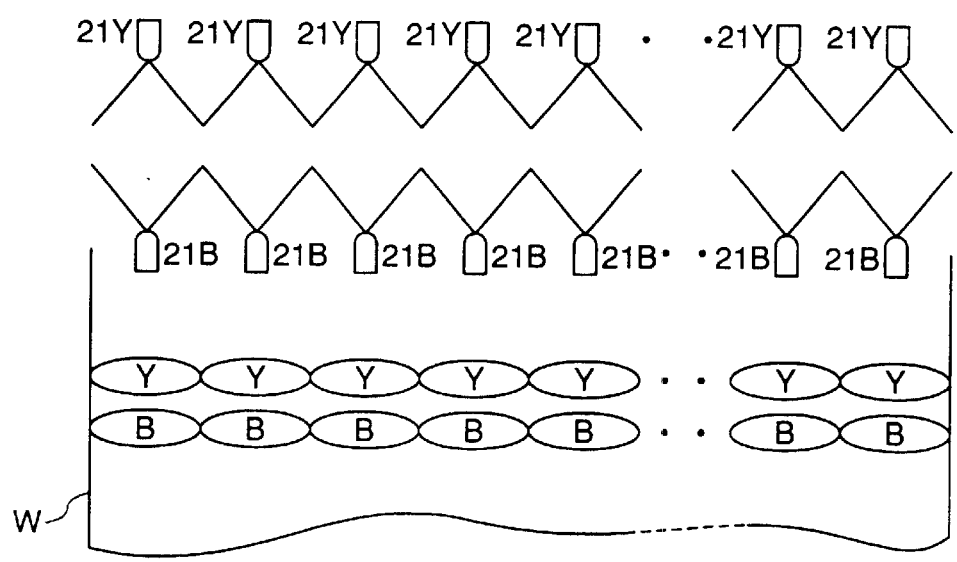
FIG. 12 is a development illustrating an outline of the layout of light sources of two types of light provided in the image reading section shown in FIGS. 10 and 11, and the across-the-width area of a paper web to which light of each light source is applied.

According to the present invention, the light-emitting diodes 21 comprise blue-light emitting diodes 21B and yellow-light emitting diodes 21Y, as shown in FIGS. 6, 9 and 12. The blue-light emitting diodes 21B are the first light source emitting blue light having a dominant wavelength of 470 nm, for example. The yellow-light emitting diodes 21Y are the second light source emitting yellow light having a dominant wavelength of 540 nm, for example.

The image reading section 2 has a construction as shown in FIGS. 4 through 12, of which FIGS. 4, 5, 7, 8, 10 and 11 show the cross-sectional and side views of the image reading section 2 that read in the direction vertical to the travelling direction of the paper web W. FIGS. 6, 9 and 12 show the construction of the image reading section 2 that read in the across-the-width direction of the paper web W or the roller R.

The image reading section 2 shown in FIGS. 4, 5, 7, 8, 10 and 11 has source-side lenses 22 having the function of determining the area to which the light output by the light-emitting diodes 21 is applied, and receptor-side lenses 32 for collecting the reflected light from the paper-web surface.

Figure 4:
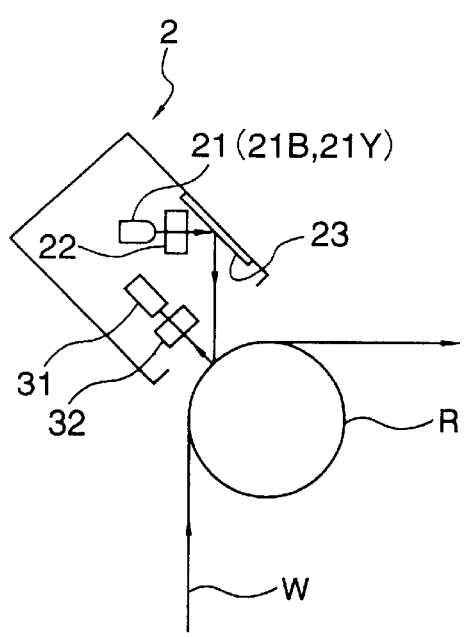
FIG. 4 is a schematic cross-sectional side view of the image reading section of printed image inspection apparatus embodying the present invention.
Figure 7:
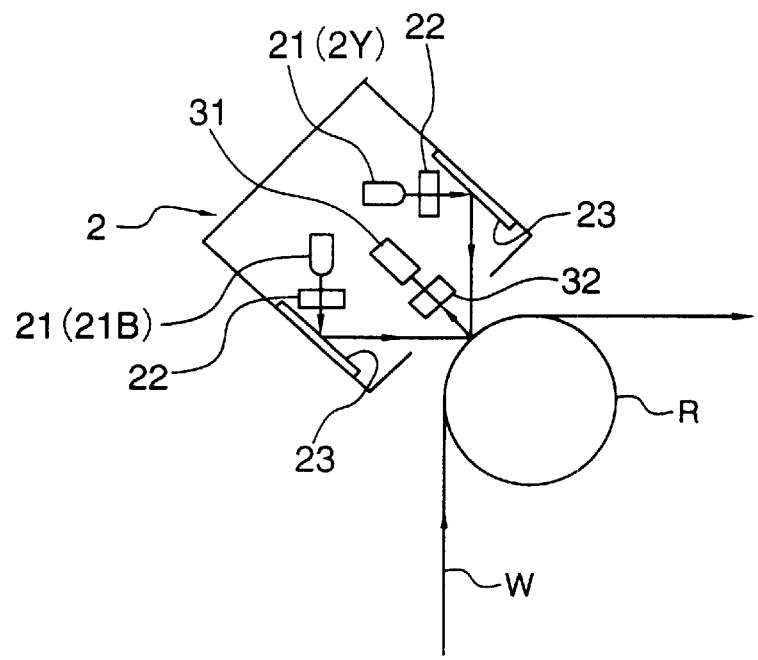
FIG. 7 is a schematic cross-sectional diagram of the image reading section of printed image inspection apparatus embodying the present invention.
Figure 10:
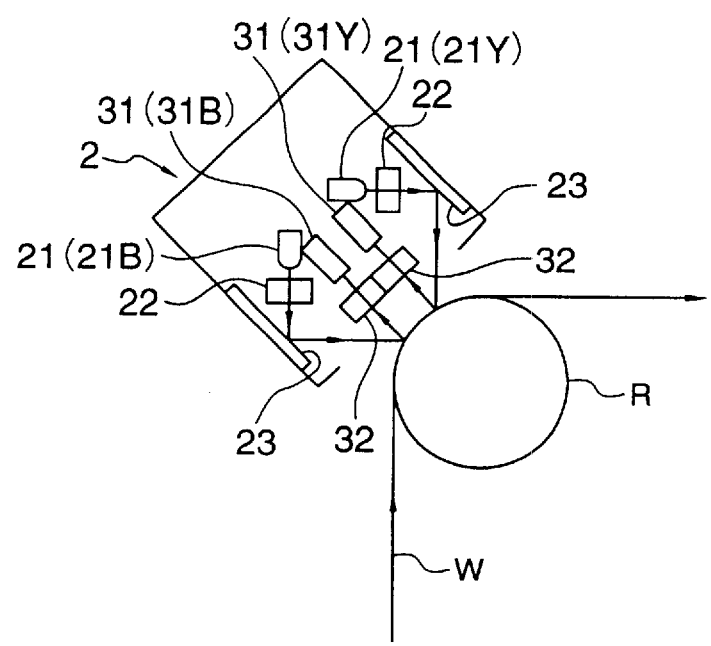
FIG. 10 is a schematic cross-sectional diagram of the image reading section of printed image inspection apparatus embodying the present invention.

The image reading section 2 shown in FIGS. 4, 7 and 10 has a mirror 23 for reflecting the light emitted by the light-emitting diodes 21 to the paper web surface. These elements of the image reading section 2 are disposed so that the light emitted by the light-emitting diodes 21 is directed toward the paper web surface via the source-side lenses 22 and the mirror 23, and the light reflected from the paper web surface reaches the photodiodes 31 via the receptor-side lenses 32. That is, the image reading section 2 can be made more compact by disposing the light-emitting diode 21 close to the photodiode 31.

Figure 5:
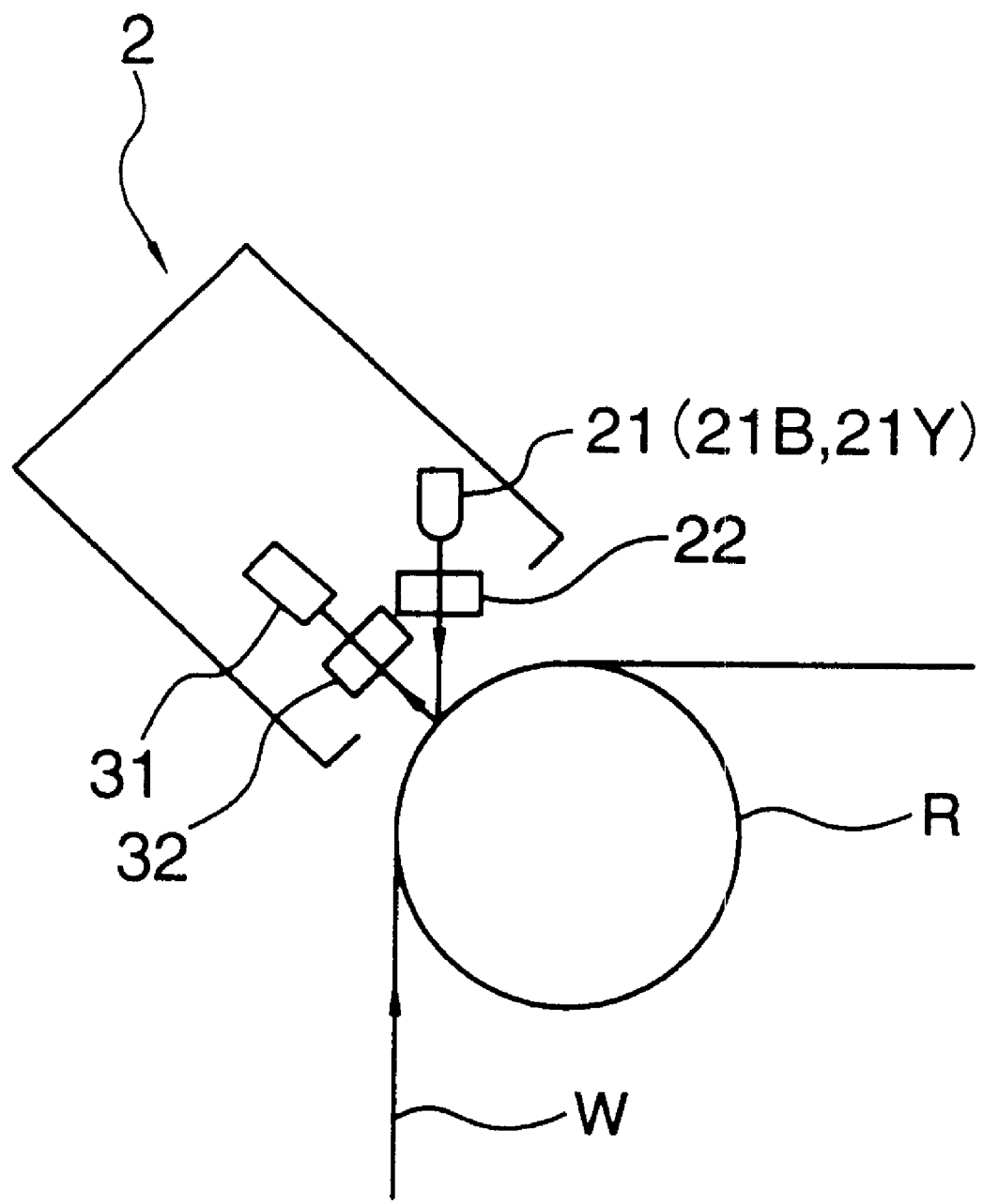
FIG. 5 is a schematic cross-sectional side view of the image reading section of printed image inspection apparatus embodying the present invention.
Figure 8:
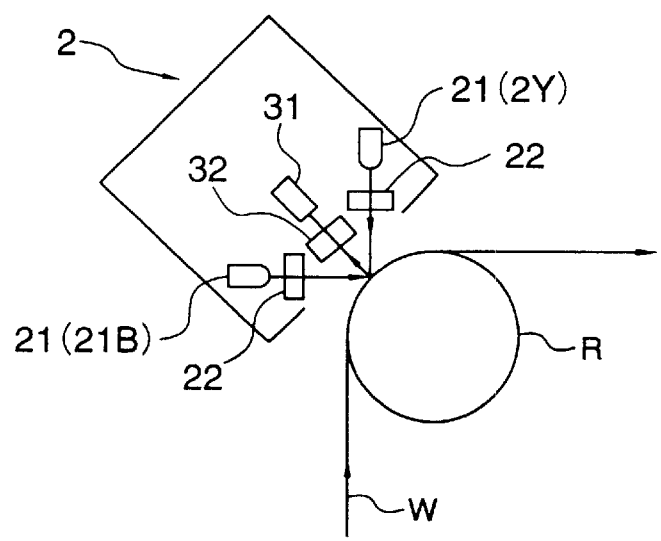
FIG. 8 is a schematic cross-sectional diagram of the image reading section of printed image inspection apparatus embodying the present invention.
Figure 11:
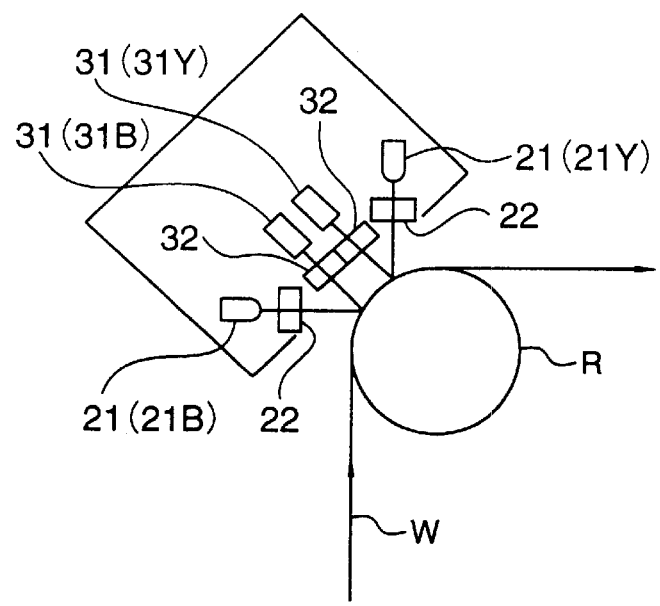
FIG. 11 is a schematic cross-sectional diagram of the image reading section of printed image inspection apparatus embodying the present invention.

The image reading section 2 shown in FIGS. 5, 8 and 11 has the same construction as the image reading section 2 shown in FIGS. 4, 7 and 10, except for the mirror 23. The elements of the image reading section 2 shown in FIG. 5, etc. are disposed so that the light emitted by the light-emitting diodes 21 is directed toward the paper web surface directly via the source-side lenses 22, and the light reflected from the paper web surface reaches the photodiodes 31 via the receptor-side lenses 22. Consequently, when compared with the image reading section 2 shown in FIG. 4, etc., the light-emitting diodes 21 have to be installed farther from photodiodes 31 by a distance since the light path from the light-emitting diode 21 to the paper web surface is not curved by the mirror 23 in the image reading section 2 in FIG. 5, etc. That is, the size of the image reading section 2 in FIG. 5 is relatively larger than that of the image reading section 2 in FIG. 4.

With the construction eliminating the mirror 23, on the other hand, equipment troubles can be reduced because failures of the image reading section 2 associated with the mirror 23, such as the lowered reflecting performance of the mirror 23 resulting from the adhesion of paper dust on the mirror surface, can be eliminated.

By selecting the performance of source-side lenses 22 appropriately, the light path between the light-emitting diodes 21 and the paper web surface can be reduced. As a result, an increase in the size of the image reading section 2 can be prevented to some extent.

Both the source-side and receptor-side lenses 22 and 32 comprise of cylindrical lenses. The light emitted by the light-emitting diodes 21 can be applied to a relatively wide area of the paper web surface in the across-the-width direction, and the photodiodes 31 can read a relatively wide area of the paper web surface in the across-the-width direction.

In the image reading section 2 shown in FIGS. 4 and 5, the first and second light sources, that is, the blue-light emitting diodes 21B and the yellow-light emitting diodes 21Y, are provided in a row and alternately along the width of the paper web (W) surface they face, as shown in FIG. 6. Though not shown in the figures, the photodiodes 31 are provided in a row, matching with this row of light-emitting diodes.

With this construction where the first and second light sources uses the source-side lenses 22 in common, the image reading section 2 can be made more compact. With this arrangement, however, trouble in maintenance will increase because a densely-arranged and mixed row of two types of light-emitting diodes 21B and 21Y involves complicated wiring.

The image reading section 2 shown in FIGS. 7 and 8 has the first and second light sources, that is, blue-light emitting diodes 21B and yellow-light emitting diodes 21Y, are separately provided each in a row along the width of the facing paper web surface, as shown in FIG. 9. Only one row of the photodiodes 31 is provided in such a manner as to receive both the light emitted by the first light source and reflected from the paper web surface and the light emitted by the second light source and reflected from the paper web surface.

With this construction, each of the first and second light sources requires separate source-side lenses 22, making the image reading section 2 slightly larger in size. This construction, on the other hand, involves sparsely-arranged and separate rows of two types of light-emitting diodes 21B and 21Y. As a result, this construction requires less complicated wiring, compared with the image reading section 2 shown in FIGS. 4 and 5, making maintenance easier.

The image reading section 2 shown in FIGS. 4, 5, 7 and 8 has only one row of the photodiodes 31. As will be described later, the image reading section 2 switches via the operation control section 6 the blue-light emitting diodes 21B, 21B, . . . as the first light source, and the yellow-light emitting diodes 21Y, 21Y, . . . as the second light source alternately on and off. This permits the same photodiodes 31, 31, . . . (only one of them is shown in the side view) to alternately read the reflections from the paper web surface of the two types of light. In other words, the photodiodes 31 are used in a time-division mode; receiving the reflected light of the blue-light emitting diodes 21B at a given timing, and receiving the reflected light of the yellow-light emitting diodes 21Y at the subsequent timing. Consequently, as the paper web travels during printing operation, the paper web areas B, B, . . . irradiated with the blue-light emitting diodes 21B, 21B, . . . as the first light source and the paper web areas Y, Y, . . . irradiated with the yellow-light emitting diodes 21Y, 21Y, . . . as the second light source are shifted from each other by a distance L in the travelling direction of the paper web W, as shown in FIGS. 6 and 9. The distance L is a distance by which the paper web W travels during the period from the light emission of the blue-light emitting diodes 21B to the light emission of the yellow-light emitting diodes 21Y. For this reason, images produced by the reflected light from the first and second light sources on the same location of the paper web surface cannot be read. As a result, there is a likelihood of failure to detect defective parts during the inspection of relatively fine printed images.

In the image reading section 2 shown in FIGS. 10 and 11, on the other hand, the first and second light sources, that is, the blue-light emitting diodes 21B and the yellow-light emitting diodes 21Y are provided separately each in a row, as shown in FIG. 12 along the width of the paper web W. The photodiodes 31 are provided in two rows separated by an appropriate distance or adjacent to each other in the travelling direction of the paper web W. One of the two rows of the photodiodes 31 is disposed in such a manner as to receive the light emitted by the first light source and reflected by the paper web surface. The other of the two rows of the photodiodes 31 is disposed in such a manner as to receive the light emitted by the second light source and reflected by the paper web surface. With this construction, the area B irradiated with the blue-light emitting diodes 21B, 21B, . . . as the first light source, the area Y irradiated with the yellow-light emitting diodes 21Y, 21Y, . . . as the second light source, the timing at which the two light sources are turned on and off, the spacing between the two rows of the photodiodes 31B, 31B, . . . and 31Y, 31Y, . . . (the side view of only one photodiode is shown in the figure) are set to appropriate relations. That is, the yellow-light emitting diodes 21Y are caused to emit light at a timing at which the area B reaches the area Y as the result of the travelling of the paper web W. The two rows of the photodiodes 31B and 31Y are disposed at such locations that each of them can receive the reflected light from the areas B and Y, respectively. Consequently, the photodiodes 31B and 31Y can read images produced by both the light of the first and second light sources reflected from the same location of the paper web surface. This permits the printed images on the overall surface of the paper web W that travels during printing operation to be read using the light emitted by the two light sources and reflected from the paper web surface. That is, printed images on the overall paper-web surface can be read separately by the two types of light. This is effective in positively detecting defective parts of relatively fine printed images.

In addition, this construction makes it possible to simultaneously perform the processing of data read with the first and second light sources.

This construction also has advantages in terms of wiring and maintenance, as in the case of the image reading section 2 shown in FIGS. 7 and 8. This construction requires separate source-side lenses 22 for the first and second light sources, and enough space for providing two rows of photodiodes 31B, 31B, . . . and 31Y, 31Y, . . . separated by an appropriate distance or adjacent to each other. This makes the image reading section 2 larger than the image reading section 2 shown in FIGS. 7 and 8.

Figure 2:
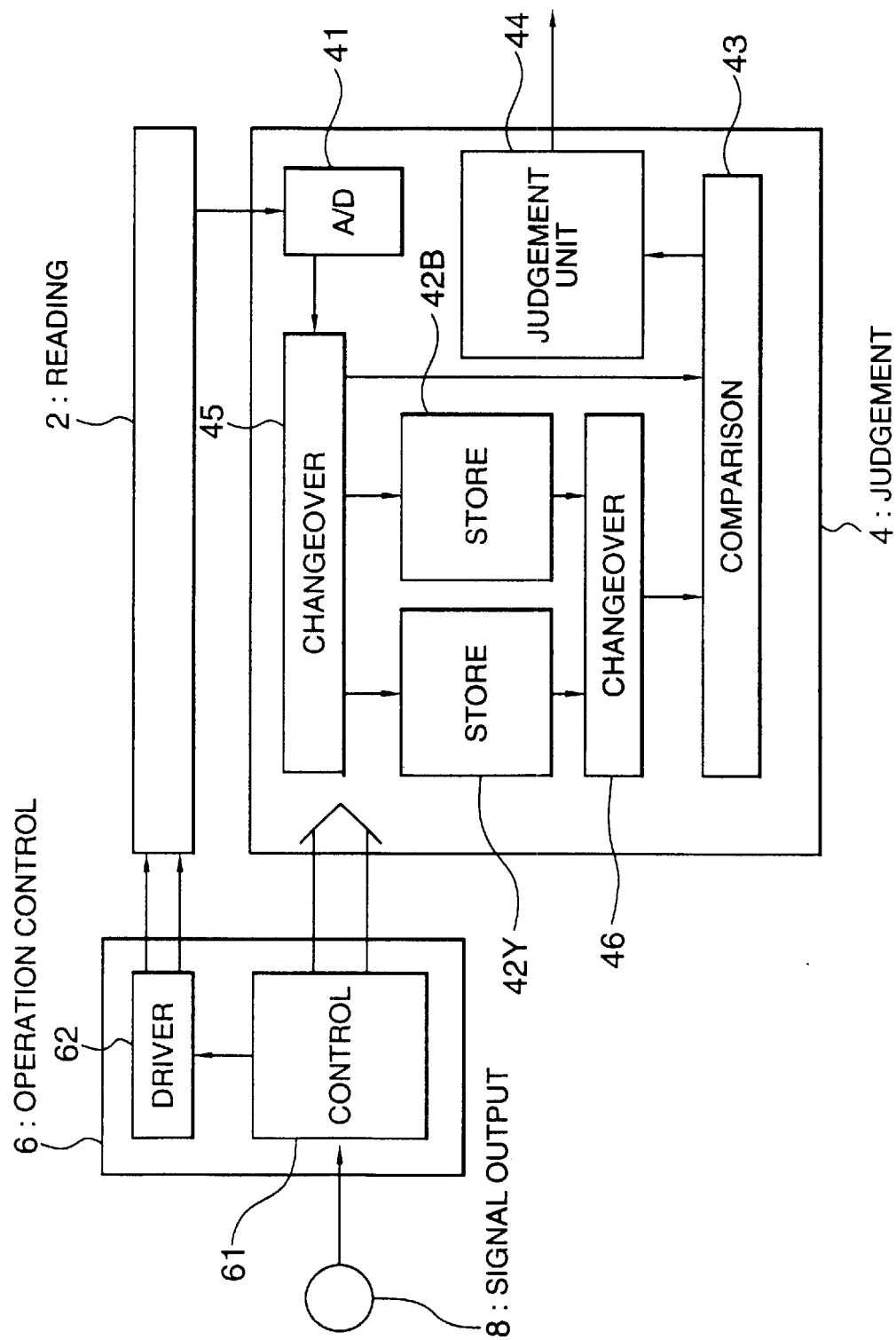
FIG. 2 is a block diagram illustrating printed image inspection apparatus embodying the present invention.
Figure 3:
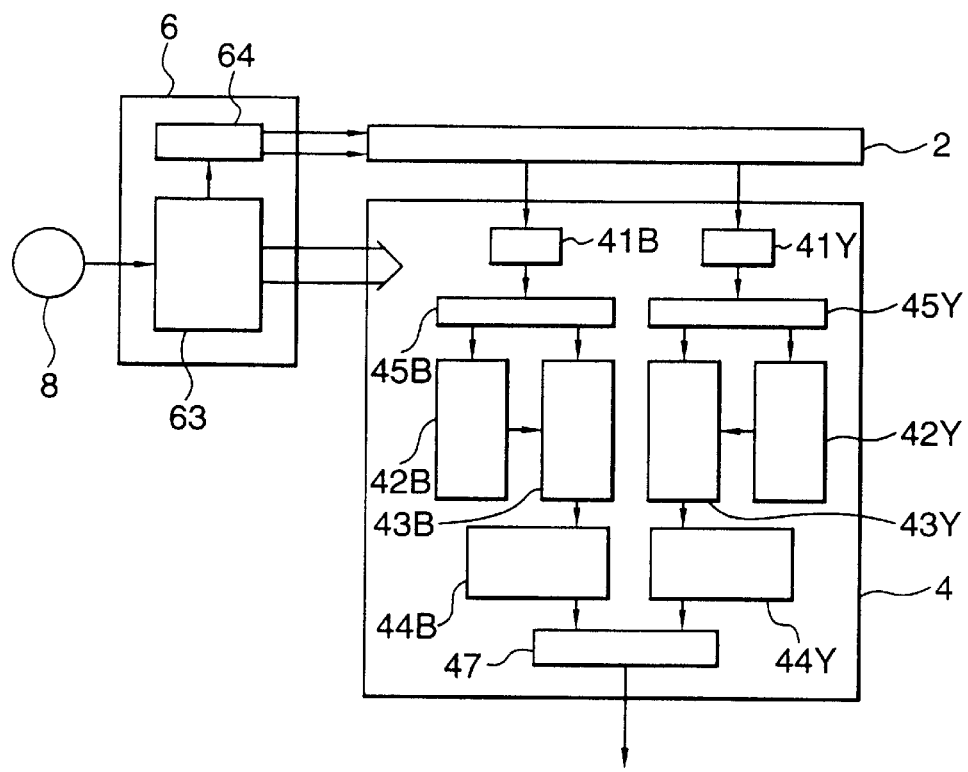
FIG. 3 is a block diagram illustrating printed image inspection apparatus embodying the present invention.

The judgment section 4 has such a construction as shown in FIG. 2 or 3, for example.

The judgment section 4 shown in FIG. 2 corresponds to the image reading section 2 shown in FIGS. 4 through 9. That is, it corresponds to the image reading section 2 that reads printed images from both the light emitted by the first and second light sources and reflected from the paper web surface by means of one row of the same photodiodes 31, 31, . . . .

The judgment section 4 comprises a converter subsection (or unit) 41, a first memory subsection 42B, a second memory subsection 42Y, a comparator subsection 43 and a judgement subsection 44. The judgment section 4 also has a destination changeover subsection 45 and a source changeover subsection 46. The converter subsection 41 A/D-converts signals output by the photodiodes 31, 31, . . . of the image reading section 2. The first memory subsection 42B stores the reference image data on the image read from the reflection of the blue light output by the first light source. The second memory subsection 42Y stores the reference image data from the reflection of the yellow light output by the second light source. The comparator subsection 43 compares the signal output by the converter subsection 41 with the data stored in the first memory subsection 42B or the second memory subsection 42Y. The judgment subsection 44 judges whether the comparison results by the comparator subsection 43 are within a predetermined allowable range, and generates a signal if the results exceed the allowable range. The destination changeover subsection 45 selectively switches over the destination of the signal generated by the converter subsection 41. The source changeover subsection 46 selectively switches over the source of the reference image data fed to the comparator subsection 43.

The judgment section 4 shown in FIG. 3 corresponds with the image reading section 2 shown in FIGS. 10 through 12, in which the photodiodes 31B, 31B, . . . on any one of the two rows of photodiodes 31 reads a printed image from the reflection from the paper web surface of the light emitted by the first light source, whereas the photodiodes 31Y, 31Y, . . . on the other of the two rows reads a printed image from the reflection from the paper web surface of the light emitted by the second light source.

This judgment section 4 comprises a first converter subsection 41B, a second converter subsection 41Y, a first memory subsection 42B, a second memory subsection 42Y, a first comparator subsection 43B, a first judgment subsection 44B, a second comparator subsection 43Y, a second judgment subsection 44Y and an OR circuit 47. Furthermore, the judgment section 4 has a first destination changeover subsection 45B and a second destination changeover subsection 45Y. The first converter subsection 41B A/D-converts a signal output by the photodiodes 31B, 31B, . . . of the image reading section 2. The second converter subsection 41Y A/D-converts a signal output by the photodiodes 31Y, 31Y, . . . of the image reading section 2. The first memory subsection 42B stores the reference image data on the image read from the reflection of the blue light output by the first light source. The second memory subsection 42Y stores the reference image data on the image read from the reflection of the yellow light output by the second light source. The first comparator subsection 43B compares the signal converted and output by the first converter subsection 41B with the data stored by the first memory subsection 42B. The first judgment subsection 44B judges whether the comparison results by the first comparator subsection 43B are within a predetermined allowable range, and generates a signal if the results exceed the allowable range. The second comparator subsection 43Y compares the signal converted and output by the second converter subsection 41Y with the data stored by the second memory subsection 42Y. The second judgment subsection 44Y judges whether the comparison results by the second comparator subsection 43Y are within a predetermined allowable range, and generates a signal if the results exceed the allowable range. The OR circuit 47 outputs a signal upon receipt of a signal output by the first judgment subsection 44B or the second judgment subsection 44Y. The first destination changeover subsection 45B selectively changes over the destination of the signal output by the first converter subsection 41B. The second destination changeover subsection 45Y selectively changes over the destination of the signal output by the second converter subsection 41Y.

The operation control section 6 is connected to web travel signal output means 8 that outputs a signal relating to the travel of the paper web W during the operation of the printing machine, as shown in FIGS. 2 and 3, and also connected to the image reading section 2 and the judgment section 4. The operation control section 6 outputs a control signal to the image reading section 2 and the judgment section 4 by correlating to a signal output by the web travel signal output means 8.

The operation control section 6 shown in FIG. 2 has a control subsection 61 and a light source driver 62. The control subsection 61 processes a signal output by the web travel signal output means 8 and outputs several signals by correlating to this signal. The light source driver 62 outputs signals to alternately turn on and off the first light source and the second light source so as to cause the blue-light emitting diode 21B as the first light source of the image reading section 2 and the yellow-light emitting diode 21Y as the second light source to alternately emit light based on the signal output by the control subsection 61.

The operation control section 6 shown in FIG. 3 has a control subsection 63 and a light source driver 64. The control subsection 63 processes a signal output by the web travel signal output means 8 and outputs several signals by correlating to this signal. The light source driver 64 outputs signals to separately turn on and off the blue-light emitting diode 21B as the first light source of the image reading section 2 and the yellow-light emitting diode 21Y as the second light source based on the signal output by the control subsection 63. The web travel signal output means 8 is a rotary encoder, for example.

Inspection of a full-color printed image on printing paper and newsprint in the printed image inspection apparatus 1 having the aforementioned construction will be described in the following.

Prior to inspection of a printed image, reference image data on an image read by the first light source are stored in the first memory subsection 42B of the judgment section 4, and reference image data on an image read by the second light source are stored in the second memory subsection 42Y of the judgment section 4.

The judgment section 4 shown in FIG. 2 causes the image reading section 2 to operate by the control of the operation control section 6, as in the case of the inspection of printed images being inspected, which will be described later. As a result of this operation, the judgment section 4 of FIG. 2 reads two reference images of the printed image being inspected by the light emitted from the blue-light emitting diode 21B and the yellow-light emitting diode 21Y of the image reading section 2, and store as reference image data the reference images read by the blue-light emitting diode 21B and the yellow-light emitting diode 21Y in the first and second memory subsections 42B and 42Y, respectively, which will be alternately selected by the destination changeover subsection 45 in synchronism with the light-emitting timing of the blue-light emitting diode 21B and the yellow-light emitting diodes 21Y.

The judgment section 4 shown in FIG. 3 causes the image reading section 2 to operate by the control of the operation control section 6, as in the case of the inspection of printed images being inspected, which will be described later. As a result of this operation, the judgment section 4 of FIG. 3 reads two reference images of the printed image being inspected by the light emitted from the blue-light emitting diode 21B and the yellow-light emitting diode 21Y of the image reading section 2, and store as reference image data the data read by the light emitted from the blue-light emitting diode 21B in the first memory subsection 42B, which is selected as an input destination by the first destination changeover subsection 45B, and store as the reference image data the data read by the light emitted by the yellow-light emitting diode 21Y in the second memory subsection 42Y, which is selected as an input destination by the second destination changeover subsection 45Y.

The reference image data can be entered into the first and second memory subsections 42B and 42Y by causing the image reading section 2 to read a good printed image obtained by the printing machine P as the reference image for the printed image being inspected.

The reference image data can also be entered into the first and second memory subsections 42B and 42Y by causing appropriate reading means (not shown) to read a good printed image, such as a sample copy of the printed image being inspected, and directly feed to the first and second memory subsections 42B and 42Y without relying on the destination changeover subsection 45, or the first or second destination changeover subsection 45B or 45Y, though the construction of these sections and subsections is not shown.

Next, the reference image data on the image read from the reflection of the light emitted by the blue-light emitting diode 21B are stored in the first memory subsection 42B, and the reference image data on the image read from the reflection of the light emitted by the yellow-light emitting diode 21Y are stored in the second memory subsection 42Y, then the printed images being inspected that have been printed continuously by the printing machine P are inspected sequentially and continuously in the following manner as the paper web W travels.

In the construction shown in FIG. 2, the control subsection 61 of the operation control section 6 outputs several control signals by correlating to the signals relating to the travel of the paper web W output by the web travel signal output means 8 so as to ensure the efficient operation of the judgment section 4 as a whole, as will be described later, and also outputs a control signal to operate the light source driver 62.

The light source driver 62 outputs a light source on-off signal to the image reading section 2 based on the control signal from the control subsection 61 so that the first and second light sources can alternately emit light every time the paper web W travels by a predetermined distance, L as shown in FIG. 6, for example.

In the image reading section 2, the blue-light emitting diode 21B as the first light source and the yellow-light emitting diode 21Y as the second light source alternately emit light based on the aforementioned light source on-off signal to alternately irradiate the travelling paper web W with blue and yellow light.

The light emitted by the blue-light emitting diode 21B is reflected by an image area printed with cyan ink and the white background of the paper web W to create a reflection representing "brightness," and absorbed by the printed image area, other than the image area printed with cyan ink, to create a reflection representing "darkness." The light emitted by the yellow-light emitting diode 21Y is reflected by the image area printed with yellow ink and the white background of the paper web W to create a reflection representing "brightness," and absorbed by the printed image area, other than the image area printed with yellow ink, to create a reflection representing "darkness."

These two reflections are alternately received by the same photodiode 31, which in turn outputs a signal corresponding to the received reflections to the converter subsection 41.

The converter subsection 41 A/D-converts the signal output by the photodiode 31 to feed to the comparator subsection 43 selected by the destination changeover subsection 45 via the destination changeover subsection 45.

The comparator subsection 43 compares the signal input via the destination changeover subsection 45 and output by the converter subsection 41 with the reference image data stored in the first or second memory subsection 42B or 42Y, and outputs the results to the judgment subsection 44. During this comparison, the source changeover subsection 46 alternately selects the first or second memory subsection 42B or 42Y in synchronism with alternate light emission by the first and second light sources, and the comparator subsection 43 receives reference image data being compared via the source changeover subsection 46 from any of the selected first or second memory subsection 42B or 42Y.

The judgment subsection 44 judges, based on the signal input from the comparator subsection 43, whether the comparison results are within a predetermined allowable range. When the comparison results are not within the allowable range, that is, when the judgement is "no," the judgement subsection 44 outputs a predetermined signal. This signal is used appropriately for alarming, printing defect indication, or automatic rejection of defective printed matter, for example.

In the construction shown in FIG. 3, the control subsection 63 of the operation control section 6 outputs several signals by correlating to the signal relating to the travel of the paper web W output by the web travel signal output means 8 so as to ensure the efficient operation of the judgment section 4 as a whole, as will be described later, and also outputs a control signal to operate the light source driver 64.

The light source driver 64 outputs a light source on-off signal to the image reading section 2 based on the control signal from the control subsection 63 so that the first and second light sources can respectively emit light every time the paper web W travels by a predetermined distance, L as shown in FIG. 6, for example.

In the image reading section 2, the blue-light emitting diode 21B as the first light source and the yellow-light emitting diode 21Y as the second light source emit light based on the aforementioned light source on-off signals to irradiate the travelling paper web W with blue and yellow light.

The light emitted by the blue-light emitting diode 21B is reflected by an image area printed with cyan ink and the white background of the paper web W to create a reflection representing "brightness," and absorbed by the printed image area, other than the image area printed with cyan ink, to create a reflection representing "darkness." The light emitted by the yellow-light emitting diode 21Y is reflected by the image area printed with yellow ink and the white background of the paper web W to create a reflection representing "brightness," and absorbed by the printed image area, other than the image area printed with yellow ink, to create a reflection representing "darkness."

The reflection of the light emitted by the blue-light emitting diode 21B is received by the photodiode 31B, which in turn outputs a signal corresponding to the received reflection to the converter subsection 41B.

The first converter subsection 41B A/D-converts the signal output by the photodiode 31B to feed to the first comparator subsection 43B selected by the first destination changeover subsection 45B via the first destination changeover subsection 45B.

The first comparator subsection 43B compares the signal input via the first destination changeover subsection 45B and output by the first converter subsection 41B with the corresponding data among the reference image data stored in the first memory subsection 42B, and outputs the results to the first judgment subsection 44B. During this comparison, the first comparator subsection 43B receives the reference image data being compared directly from the first memory subsection 42B.

The first judgment subsection 44B judges, based on the signal input from the first comparator subsection 43B, whether the comparison results are within a predetermined allowable range. When the judgement is "no," the signal is putout via an OR circuit 47.

The reflection of the light emitted by the yellow-light emitting diode 21Y is received by the photodiode 31Y, which in turn outputs a signal corresponding to the received reflection to the second converter subsection 41Y.

The second converter subsection 41Y A/D-converts the signal output by the photodiode 31Y to feed to the second comparator subsection 43Y selected by the second destination changeover subsection 45Y via the second destination changeover subsection 45Y.

The second comparator subsection 43Y compares the signal input via the second destination changeover subsection 45Y and output by the second converter subsection 41Y with the corresponding data among the reference image data stored in the second memory subsection 42Y, and outputs the results to the second judgment subsection 44Y. During this comparison, the second comparator subsection 43Y receives the reference image data being compared directly from the second memory subsection 42Y.

The second judgment subsection 44Y judges, based on the signal input from the second comparator subsection 43Y, whether the comparison results are within a predetermined allowable range. When the judgement is "no," the signal is putout via an OR circuit 47.

As described above, the configuration shown in FIG. 3 makes it possible to totally separately and concurrently carry out the judgment as to the reflection from the light emitted by the blue-light emitting diode 21B as the first light source, and the judgment as to reflection from the light emitted by the yellow-light emitting diode 21Y as the second light source.

As described above, the present invention makes it possible to inspect printed images with two types of light with higher accuracy than the conventional type of printed image inspection apparatus since not only printing stains by yellow, cyan or magenta ink on the white background of the paper web but also printing stains by cyan or magenta ink on a yellow-ink background can be detected as "darkness" in the reflection of yellow light, printing stains by yellow and magenta ink on a cyan-ink background can be detected as "darkness" in the reflection of blue light, printing stains by yellow ink on a magenta-ink background can be detected as "brightness" in the reflection of yellow light, and printing stains by cyan ink on a magenta-ink background can be detected as "brightness" in the reflection of blue light.

According to the present invention, printed images on paper of a low brightness can be inspected using two types of light with higher accuracy than with the conventional type of printed image inspection apparatus since any images printed, whether with yellow ink or magenta ink, on printing paper or newsprint satisfying JIS standards, even of a low brightness, can be positively detected because blue and yellow light are used as the two types of light to detect an area printed with magenta ink as "darkness" in the reflection of the two types of light.

What is claimed is:

1. A printed image inspection apparatus comprising:
   a first light source emitting blue light to a printed image being inspected, said blue light having a low reflectance with respect to yellow, magenta and black inks;
   a second light source emitting yellow light to said printed image being inspected, said yellow light having a different dominant wavelength from said first light source and having a low reflectance with respect to cyan, magenta and black inks;
   an image reading section to read reflected light of said first and second light source from said printed image as first and second reflected images respectively;
   reference images stored in a memory;
   a judgment section to compare said reflected images read by said image reading section with said reference images to judge an agreement between both, said judgment section detects stains by yellow or magenta ink on a cyan ink background as darkness in a reflection of said blue light, and stains by cyan ink on a magenta-ink background as brightness in said reflection of said blue light, said judgment section detects stains by cyan or magenta ink on a yellow-ink background as darkness in a reflection of said yellow light, said judgement section detects stains by yellow ink on a magenta-ink background as brightness in said reflection of said yellow light.

2. A printed image inspection apparatus as set forth in claim 1 wherein said first light source emits blue light whose dominant wavelength is within a range of 430 nm to 480 nm, and
   said second light source emits yellow light whose dominant wavelength is within a range of 540 nm to 540 nm.

3. A printed image inspection apparatus as set forth in claim 1 wherein said first light source emits blue light whose dominant wavelength is substantially 470 nm, and
   said second light source emits yellow light whose dominant wavelength is substantially 590 nm.

4. A printed image inspection apparatus as set forth in claim 1 wherein said image reading section also has a plurality of photodiodes for receiving the reflection from said printed image being inspected of light emitted by said first and second light sources;
   a plurality of blue-light emitting diodes as said first light source and a plurality of yellow-light emitting diodes as said second light source are alternately disposed in a row along the across-the-width direction of a paper web on which said printed image being inspected is printed, and
   said plurality of photodiodes are disposed in the across-the-width direction of a paper web on which said printed image being inspected is printed so as to receive both the reflections from said printed image being inspected of light emitted by said first and second light sources.

5. A printed image inspection apparatus as set forth in claim 4 wherein light emitted by said first and second light sources is reflected directly by paper on which said printed image being inspected is printed and received by said plurality of photodiodes.

6. A printed image inspection apparatus as set forth in claim 4 wherein said image reading section has a mirror for reflecting light emitted by said first and second light sources, and
   the light emitted by said first and second light sources is reflected by said mirror, and then by paper on which said printed image being inspected is printed, and received by said photodiodes.

7. A printed image inspection apparatus as set forth in claim 4 wherein said operation control section controls said image reading section so that said first and second light sources alternately emit light.

8. A printed image inspection apparatus as set forth in claim 4 wherein said judgement section comprises
   a converter subsection for A/D-converting a signal output by said plurality of photodiodes of said image reading section,
   a first memory subsection for storing reference image data on the image read from the reflection of blue light emitted by said first light source,
   a second memory subsection for storing reference image data on the image read from the reflection of yellow light emitted by said second light source,
   a comparator subsection for comparing a signal converted and output by said converter subsection with the data stored in said first or second memory subsection, and
   a judgement subsection for judging whether comparison results by said comparator subsection are with a predetermined allowable range, and outputting a signal when the comparison results exceed the allowable range.

9. A printed image inspection apparatus as set forth in claim 1 wherein said image reading section has a plurality of photodiodes for receiving the reflections from said printed image being inspected of the light emitted by said first and second light sources;
   a plurality of blue-light emitting diodes as said first light source and a plurality of yellow-light emitting diodes as said second light source are separately disposed each in a row along the across-the-width direction of paper on which said printed image being inspected is printed;
   and said plurality of photodiodes are disposed in a row along the across-the-width direction of paper on said printed image being inspected is printed so as to receive both the reflections from said printed image being inspected of the light emitted by said first and second light sources.

10. A printed image inspection apparatus as set forth in claim 9 wherein the light emitted by said first and second light sources is reflected directly by paper on which said printed image being inspected is printed, and received by said plurality of photodiodes.

11. A printed image inspection apparatus as set forth in claim 9 wherein said image reading section also has first and second mirrors each reflecting the light emitted by said first and second light sources, respectively, and
    the light emitted by said first and second light sources is reflected by said first and second light mirrors, and then by paper on which said printed image being inspected is printed, and received by said plurality of photodiodes.

12. A printed image inspection apparatus as set forth in claim 1 wherein said image reading section also has a plurality of photodiodes for receiving the reflections from said printed image being inspected of the light emitted by said first and second light sources,
    a plurality of blue-light emitting diodes as said first light source and a plurality of yellow-light emitting diodes as said second light source are separately disposed each in a row along the across-the-width direction of paper on which said printed image being inspected is printed, and said plurality of photodiodes are separately disposed in two rows along the across the-width direction of paper on which said printed image being inspected is printed; said two rows comprising a row for receiving the reflection from said printed image being inspected of the light emitted by said first light source, and a row for receiving the reflection from said printed image being inspected of the light emitted by said second light source.

13. A printed image inspection apparatus as set forth in claim 12 wherein the light emitted by said first and second light sources is reflected directly by paper on which said printed image being inspected is printed, and received by said plurality of photodiodes.

14. A printed image inspection apparatus as set forth in claim 12 wherein said image reading section also has first and second mirrors for reflecting the light emitted by said first and second light sources, respectively, and the light emitted by said first and second light sources is reflected by said first and second mirrors, and then by paper on which said printed image being inspected is printed, and received by corresponding said plurality of photodiodes.

15. A printed image inspection apparatus as set forth in claim 12 wherein said operation control section controls the operation of said image reading section and said judgment section so that an area on paper on which said printed image being inspected is printed to which the light emitted by said first light source is applied agrees with an area on paper on which said printed image being inspected is printed to which the light emitted by said second light source is applied.

16. A printed image inspection apparatus as set forth in claim 12 wherein said judgment section comprises a first converter subsection for A/D-converting a signal output by said plurality of photodiodes of said image reading section, a second converter subsection for A/D-converting a signal output by said plurality of photodiodes of said image reading section, a first memory subsection for storing reference image data on the image read from the reflection of the blue light emitted by said first light source, a second memory subsection for storing reference image data on the image read from the reflection of the yellow light emitted by said second light source, a first comparator subsection for comparing a signal converted and output by said first converter subsection with the data stored in said first memory section, a first judgment subsection for judging whether comparison results by said first comparator subsection are within a predetermined allowable range, and outputs a signal when the comparison results exceed the allowable range, a second comparator subsection for comparing a signal converted and output by said second converter subsection with the data stored in said second memory section, and a second judgment subsection for judging whether comparison results by said second comparator subsection are within a predetermined allowable range, and outputs a signal when the comparison results exceed the allowable range.

17. A printed image inspection apparatus as set forth in claim 1, wherein said blue light has such a wavelength that reflectance with respect to yellow ink is less than 18%, and said yellow light has such a wavelength that reflectance with respect to cyan and magenta inks is less than 18%.

18. A method for inspecting a printed image, the method comprising:

irradiating the printed image with a first light having a higher amount of blue light than light reflectable by yellow and magenta ink;

irradiating the printed image with a second light having a higher amount of yellow light than light reflectable by cyan and magenta ink;

reading said first light as reflected from the printed image as a first reflected image;

reading said second light as reflected from the printed image as a second reflected image;

providing a first reference image of the printed image;

providing a second reference image of the printed image;

comparing said first reflected image with said first reference image;

indicating a difference when said first reflected image differs by more than a predetermined amount from said first reference image;

comparing said second reflected image with said second reference image;

indicating a difference when said second reflected image differs by more than a predetermined amount from said second reference image.

19. A method in accordance with claim 18, wherein:

said first reference image is a reference of the printed image with respect to reflected said first light;

said second reference image is a reference of the printed image with respect to reflected said second light.

20. A method in accordance with claim 18, wherein:

said indicating indicates stains by one of yellow and magenta ink on a cyan ink background as darkness in said comparing of said first reflected image with said first reference image;

said indicating indicates stains by cyan ink on a magenta-ink background as brightness in said comparing of said first reflected image with said first reference image;

said indicating indicates stains by one of cyan and magenta ink on a yellow-ink background as darkness in said comparing of said second reflected image with said second reference image;

said indicating indicates stains by yellow ink on a magenta-ink background as brightness in said comparing of said second reflected image with said second reference image.

21. A method in accordance with claim 18, wherein:

said first light is less than 18% reflective with respect to yellow ink;

said second light is less than 18% reflective with respect to cyan and magenta ink.

22. A method in accordance with claim 18, wherein:

said yellow, cyan and magenta ink were used to create the printed image.

* * * * *